(12) United States Patent
Gumpoltsberger et al.

(10) Patent No.: US 7,231,843 B2
(45) Date of Patent: Jun. 19, 2007

(54) DOUBLE CLUTCH TRANSMISSION

(75) Inventors: Gerhard Gumpoltsberger, Friedrichshafen (DE); Michael Ebenhoch, Friedrichshafen (DE); Markus Maier, Friedrichshafen (DE); Thomas John, Alitzheim (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 218 days.

(21) Appl. No.: 11/120,562

(22) Filed: May 3, 2005

(65) Prior Publication Data

US 2005/0247147 A1    Nov. 10, 2005

(30) Foreign Application Priority Data

May 6, 2004    (DE)    ............... 10 2004 022 413

(51) Int. Cl.
*F16H 3/08*    (2006.01)
(52) U.S. Cl. .............. 74/329; 74/330; 74/331
(58) Field of Classification Search .......... 74/329–331
See application file for complete search history.

(56) References Cited

U.S. PATENT DOCUMENTS

| | | | | | |
|---|---|---|---|---|---|
| 3,589,483 | A | * | 6/1971 | Smith | ............ 192/3.52 |
| 4,658,663 | A | * | 4/1987 | Hiraiwa | ............ 74/359 |
| 5,890,392 | A | * | 4/1999 | Ludanek et al. | ............ 74/331 |
| 6,209,406 | B1 | | 4/2001 | Sperber et al. | |
| 6,460,425 | B1 | * | 10/2002 | Bowen | ............ 74/331 |
| 6,595,077 | B1 | | 7/2003 | Geiberger et al. | |
| 6,766,705 | B1 | * | 7/2004 | Hall, III | ............ 74/331 |
| 2002/0033059 | A1 | * | 3/2002 | Pels et al. | ............ 74/329 |

FOREIGN PATENT DOCUMENTS

| | | | |
|---|---|---|---|
| DE | 43 30 170 A1 | | 3/1995 |
| EP | 0 061 845 A2 | | 10/1982 |
| EP | 1 141 580 B1 | | 8/2003 |
| EP | 1 342 934 A2 | | 9/2003 |
| EP | 1 342 935 A2 | | 9/2003 |
| GB | 2103317 A | * | 2/1983 |
| JP | 60175845 A | * | 9/1985 |

* cited by examiner

*Primary Examiner*—Ha Ho
(74) *Attorney, Agent, or Firm*—Davis Bujold & Daniels, P.L.L.C.

(57) ABSTRACT

A dual clutch transmission with two clutches, two relative coaxial input shafts, two relative coaxial countershafts, two drive constants (gear trains, as well as one concentric transmission output shaft to the two drive shafts. Such a transmission structure is to be further embodied in such a way that through minor variations of gear mechanisms based on a construction module concept, seven-speed and eight-speed dual clutch transmissions with different direct gears, a different number of overdrive gears as well as different overall gear ratios can be manufactured. In accordance with a generic dual clutch transmission, the two countershafts by way of a coupling device can be rotationally connected with each other, and that on the countershaft embodied as hollow shaft, an idler gear is rotationally mounted, which meshes with a fixed gear on the transmission output shaft.

18 Claims, 2 Drawing Sheets

|    | K1 | K2 | A | B | C | D | E | F | G | H | i | phi |
|----|----|----|---|---|---|---|---|---|---|---|---|-----|
| G1 |    | ●  |   |   |   | ● |   |   | ● |   | 4,8 | 6,8 |
| G2 | ●  |    |   | O |   | O |   |   | ● |   | 2,7 | 1,8 |
| G3 |    | ●  |   | ● |   |   |   | O | O |   | 1,7 | 1,6 |
| G4 | ●  |    | O | O |   |   |   | ● |   |   | 1,3 | 1,3 |
| G5 |    | ●  | ● |   |   |   | O | O |   |   | 1,0 | 1,3 |
| G6 | ●  |    | O |   | O |   | ● |   |   |   | 0,8 | 1,2 |
| G7 |    | ●  |   |   | ● | O |   |   |   |   | 0,7 | 1,2 |
| R1 |    | ●  |   |   |   | ● |   |   |   | ● | -4,3 | 0,9 |
| R2 | ●  |    |   |   |   | O |   |   |   | ● | -2,4 | 1,8 |

Fig. 2

|    | K1 | K2 | A | B | C | D | E | F | G | H | i | phi |
|----|----|----|---|---|---|---|---|---|---|---|---|-----|
| G1 |    | ●  |   |   |   | ● |   |   | ● |   | 4,8 | 4,8 |
| G2 | ●  |    |   | O |   | O |   |   | ● |   | 3,1 | 1,5 |
| G3 |    | ●  |   | ● |   |   |   | O | O |   | 2,2 | 1,4 |
| G4 | ●  |    |   | O | O |   |   | ● |   |   | 1,7 | 1,3 |
| G5 |    | ●  |   |   | ● |   | O | O |   |   | 1,4 | 1,2 |
| G6 | ●  |    | O |   | O |   | ● |   |   |   | 1,2 | 1,2 |
| G7 |    | ●  | ● |   |   |   | O |   |   |   | 1,0 | 1,2 |
| R1 |    | ●  |   |   |   | ● |   |   |   | ● | -4,3 | 0,9 |
| R2 | ●  |    |   |   |   | O |   |   |   | ● | -2,8 | 1,5 |

Fig. 3

|    | K1 | K2 | A | B | C | D | E | F | G | H | i | phi |
|----|----|----|---|---|---|---|---|---|---|---|---|-----|
| G1 |    | ●  |   |   |   | ● |   |   | ● |   | 4,8 | 8,6 |
| G2 | ●  |    |   | O |   | O |   |   | ● |   | 2,7 | 1,8 |
| G3 |    | ●  |   | ● |   |   |   | O | O |   | 1,7 | 1,6 |
| G4 | ●  |    | O | O |   |   |   | ● |   |   | 1,3 | 1,3 |
| G5 |    | ●  | ● |   |   |   | O | O |   |   | 1,0 | 1,3 |
| G6 | ●  |    | O |   | O |   | ● |   |   |   | 0,8 | 1,2 |
| G7 |    | ●  |   |   | ● | O |   |   |   |   | 0,7 | 1,2 |
| G8 | ●  |    | ● |   |   | ● |   |   |   |   | 0,6 | 1,3 |
| R1 |    | ●  |   |   |   | ● |   |   |   | ● | -4,3 | 0,9 |
| R2 | ●  |    |   |   |   | O |   |   |   | ● | -2,4 | 1,8 |

Fig. 4

DOUBLE CLUTCH TRANSMISSION

This application claims priority from German Application Serial No. 10 2004 022 413.7 filed May 6, 2004.

FIELD OF THE INVENTION

The present invention relates to a dual clutch transmission.

BACKGROUND OF THE INVENTION

Dual clutch transmissions of this kind are known, for example, from prior publications EP 1 141 580 B1, EP 1 342 934 A2, EP 1 342 935 A2, EP 0 061 845 A2 and DE 43 30 170 A1. Such an automatic transmission has two axial parallel clutch arrangements actuated by a motor shaft, wherein the first clutch on the input side is fitted to a centrical transmission input shaft and the second clutch, next to the gear trains of the transmission, is respectively attached to a coaxial hollow shaft facing the transmission shaft. The transmission input shaft and the hollow shaft are each fitted with fixed gears which engage through respectively related gears on two countershafts of the transmission. In this respect, such automatic transmissions have two so-called drive constants, i.e., gear assemblies that are driven directly by both clutches. One of the two countershafts is embodied as a hollow shaft and is rotationally mounted on the other countershaft. For the purpose of implementing six forward gears and one reverse gear, idler and fixed gears are arranged on both countershafts, which engage with idler and/or fixed gears on a transmission drive shaft which, in turn, is concentrically aligned with both transmissions input shafts.

The particularly known six-gear dual clutch transmission from DE 43 30 170 A1 is additionally characterized in that the gears of the drive constants are embodied as a fixed gear on one input shaft and as an idler gear on the other input shaft. It is further known from this publication that a rotationally rigid connection between the radial inner transmission input shaft and the transmission output shaft has to be created in order to implement a forward gear. Furthermore, it is provided that the countershaft, embodied as a hollow shaft, holds an additional fixed gear which meshes with an idler gear rotationally mounted on the transmission output shaft. This idler gear is connectable with the transmission drive shaft by way of a gear shift sleeve.

Finally, it can be derived from DE 43 30 170 A1 that the state of the art transmission design for the purpose of improving driving comfort aims to provide as many choices as possible in the speed reduction ratio for the individual forward gears of the transmission. In this case, the value of the so-called ratio range is of interest which takes place through the quotient of the speed reduction ratio between a higher and a neighboring lower gear. The ratio range is generally between 1.0 and 2.0. In order to attain high driving comfort, the aim is to set the ratio range digressively from the lowest to the highest gear so that the speed reduction range change becomes less and less from the lowest to the highest gear from one gear relative to the other.

Furthermore, it is in the interest of the vehicle manufacturer to optimally transmit the input power of the prime mover of a vehicle at the lowest possible consumption in every driving mode to all drive gears. This requires that the speed reduction ratio values of the individual gears be spaced apart as far as possible so that there is a wide so-called overall gear ratio. Particularly in vehicle drive trains with a diesel-internal combustion engine, a comparably high overall gear ratio is desirable, which should show a value in excess of 6.0. An overall gear ratio value of 6.0, therefore, means that the speed reduction ratio in the first transmission gear is six times higher than the speed reduction ratio in the highest transmission gear.

On the other hand, there is a need for multi-step automatic transmissions, for example, in sports cars with 4-stroke-engines with a comparable low overall gear ratio, which can certainly have a value of below 5.0. Based on the prior art, this requires a substantially different automatic transmission design which means that a transmission manufacturer must provide additional means of production, as well as maintain a high level of inventory for spare part demands.

Against this background, it is the object of the present invention to provide a dual clutch transmission with more than six forward gears which can be manufactured, through minimal variations of the transmission component, with different speed reduction ratios, overall gear ratios, direct gears and overdrive gears.

The object is achieved with the characteristics of the main claim. Advantageous developments and embodiments of the invention can be derived from the dependent claims.

SUMMARY OF THE INVENTION

The invention is accordingly comprised of a dual clutch transmission with a dual clutch wherein the output side of the first clutch is connected to a drive shaft embodied as a hollow shaft, in which the output side of the second clutch is connected in the hollow drive shaft with a centrically arranged drive shaft. Each of the two drive shafts has a fixed gear. In addition, this transmission has two countershafts, one of which is embodied as a hollow shaft, in which a centrical countershaft is rotationally mounted. Each of these two countershafts has a fixed gear with the fixed gear of the hollow drive shaft meshing with the fixed gear on the centrically arranged countershaft, while the fixed gear of the centric drive shaft meshes with the teeth of the fixed gear on the hollow embodied countershaft. In addition, this transmission has a transmission output shaft which is coaxially aligned, relative to the two drive shafts, and mounted in a transmission housing. Furthermore, the two countershafts support idler and/or fixed gears, the teeth of idler and/or fixed gears meshing on the transmission output shaft, whereby these idler gears, by way of a coupling device, are rotationally connectable with the transmission output shaft and/or at least one countershaft.

To solve this problem, it is now provided that the two countershafts can be rotationally connected to each other by way of a coupling device, combined with an idler gear being mounted on the hollow countershaft which meshes with a fixed gear on the transmission output shaft.

Without any significant variations in terms of technical production, such a transmission design allows for the manufacture of two seven-speed and one eight-speed dual clutch transmissions all of which, advantageously, have two reverse gears.

Through careful selection of the gear ratios as well as the arrangement of the different gear levels of the transmission gears, it is possible, at particularly the same initial speed ratio for the lowest gear, to manufacture two types of seven-speed-transmissions. In the first variant, the fifth gear is embodied as a direct gear with a gear ratio of i=1 and two overdrive-gears (gear six and gear seven) are available. In accordance with the other variant, the seventh gear is the direct gear of the transmission.

In another variant, the eight-speed dual clutch transmission can be manufactured with the basic structure of the transmission in which the fifth gear is designed as a direct gear with a speed ratio of i=1, and three overdrive gears (gear six, seven and eight) at a gear ratio of i<1 are available.

A preferred development of the invention provides that, by way of the axial shift of a coupling means of a coupling device C-D in the direction D, the two countershafts are non-rotationally interlockable, while the idler gear on the hollow shaft can be rotationally connected to the fixed gear on the transmission output shaft if the coupling means is shifted in the other direction C. The idler gear is preferably arranged at the axial end of the hollow shaft for this purpose.

A further embodiment of the present invention provides that the centrical countershaft exclusively carries fixed gears, and the hollow shaft carries two fixed gears as well as the aforementioned idler gear as coupling means for the two countershafts.

Furthermore, this dual clutch transmission has eight gear assemblies 01 to 08 with idler and fixed gears for seven or eight forward gears as well as two reverse gears.

Different transmission types can be designed by using the basic structure of the dual clutch transmission in accordance with the invention. This can be attained by varying the speed ratio levels of the gear assemblies 01 and 03 up to 06, while the gears continue to stay on levels 02, 07 and 08. In this way, the gear ratio for the first gear and the two reverse gears can remain unchanged. The coupling device, the transmission shafts as well as the positions of the gear levels in the transmission housing also remain unchanged.

In accordance with a first variant, the fifth gear and, in accordance with a second variant, the seventh gear both are embodied as a direct gear with a gear ratio range of i=1. In addition, it is envisioned that for the seven-speed dual clutch transmission with the fifth gear as direct gear, the gears of the gear assemblies for the sixth gear and the seventh gear constitute an overdrive ratio range of i<1.

If the seventh gear is selected as direct gear in a seven-speed dual clutch transmission embodied according to the invention, the design provides that the gears of the gear assemblies for the seventh gear form a speed ratio range of i=1 and that there is no transmission gear with a gear ratio range of i<1.

In an eight-speed dual clutch transmission with the fifth gear as direct gear, the gears of the gear assemblies for the sixth, seventh and eighth gears form a gear ratio range of i<1.

Furthermore, it is considered advantageous when seven-speed dual clutch transmissions are embodied with the fifth or seventh gear as direct gear or, as eight-speed dual clutch transmission, in such a way that all of these transmissions have the same starting torque ratio range. For example, this can be at a value of between 4.0 and 5.0 and particularly at the 4.8 value.

In order to be able to realize a seven-speed dual clutch transmission with the fifth gear as direct gear as well as two overdrive-gears (i<1) or a seven-speed dual clutch transmission with the seventh gear as direct gear, the gears of two gear levels (gear levels 02 and 04) of the transmission are switched with respect to their ratio ranges. The gears of gear level 01 are changed with regard to their number of teeth in such a way that the gear ratio range of gear level 02 relative to gear level 01 is almost equal for both gear variations.

In this context, it should be mentioned that gear level 01 of the transmission is that gear level at which the fixed gear of the hollow shaft meshes with the coaxially disposed countershaft; that gear level 02 is that gear level at which the fixed gear of the coaxially arranged drive shaft is in gear mesh with the fixed gear on the hollow countershaft, and that gear level 04 is that gear level at which the idler gear rotationally mounted on the hollow shaft meshes with a fixed gear on the transmission output shaft.

A further embodiment of the invention provides for the implementation of a seven-speed dual clutch transmission with the fifth gear as a direct gear as well as two overdrive-gears or a seven-speed dual clutch transmission with the seventh gear as direct gear; that the gears of gear level 01 as well as the gears of gear level 03 to 06 are adjusted in such a way that two dual clutch transmissions with overall gear ratios that are different relative to each other can be assembled. The gear levels 03 to 06 are, in this case, those levels which are disposed on the left and right side on the hollow shaft close to the idler gear (gear level 04).

In addition, based on the presented construction module concept, it is also possible for three different dual clutch transmissions to implement an eight-speed dual clutch transmission with the fifth gear as direct gear as well as three overdrive-gears in such a manner that the gears of the gear levels of a basic gearbox are adjusted in a way that a dual clutch transmission is achieved which, in comparison to the seven-speed dual clutch transmission with the fifth gear as direct gear as well as two overdrive-gears or to the seven-speed dual clutch transmission with the seventh gear as direct gear, has the same starting torque ratio as well as a higher overall gear ratio. A further characteristic of this eight-speed dual clutch transmission is the fact that its eighth gear does is not realized as shiftable free of interruption of tractive force.

Furthermore, it is characteristic for the embodied dual clutch transmission in accordance with the invention that the gear ratio of gear level 01 is smaller than the gear ratio of gear level 02 and gear level 04. If the fifth gear is used as direct gear in the transmission, the gear ratio of gear level 02 is smaller than the gear ratio of gear level 04. In case the seventh gear is used as direct gear in the transmission, the gear ratio of the gear level 02 is larger than the gear ratio of gear level 04.

BRIEF DESCRIPTION OF THE DRAWINGS

The invention will now be described, by way of example, with reference to the accompanying drawings in which:

FIG. 2 is a table illustrating the actuating conditions of two main clutches as well as eight coupling means for a seven-speed dual clutch transmission with the fifth gear as direct gear;

FIG. 3 is a table illustrating the actuating conditions of two main clutches as well as eight coupling means for a seven-speed dual clutch transmission with the seventh gear as direct gear; and FIG. 4 is a table illustrating the actuating conditions of two main clutches as well as eight coupling means for an eight-speed dual clutch transmission with the fifth gear as direct gear.

DETAILED DESCRIPTION OF THE INVENTION

Figure 1:
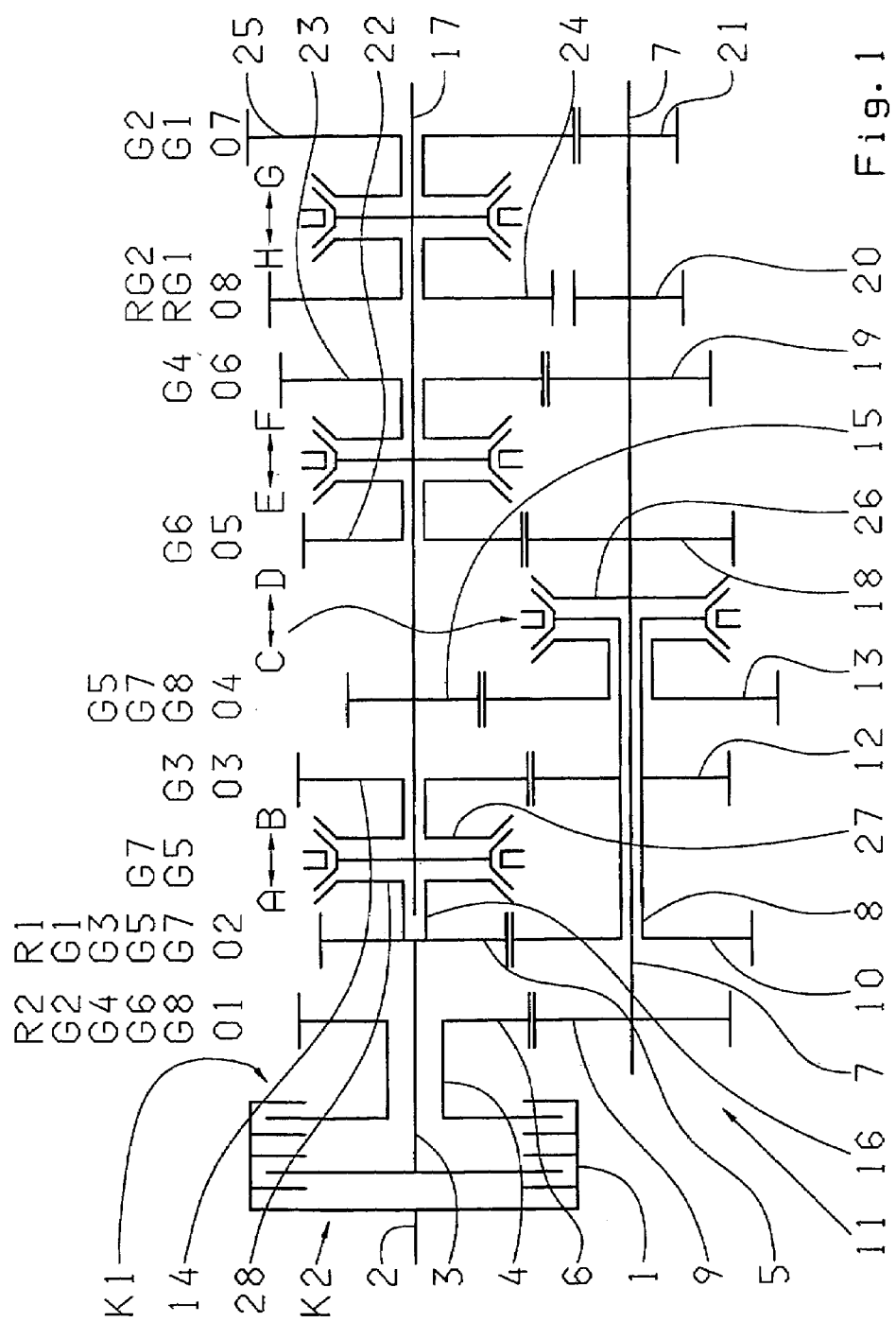
FIG. 1 is a schematic representation of the transmission structure of a seven- or eight-speed dual clutch transmission.

The basic concept of the invention is embodied in a dual clutch transmission with a design as shown in FIG. 1 the layout of which is designed for a concentric power input and output with at least seven available powershift transmission gears G1, G2, G3, G4, G5, G6 and G7. An eighth non-powershift selectable gear can be used as an additional overdrive gear. Furthermore, the dual clutch transmission has two reverse gears which can, for example, offer an advantage where maneuvering with a trailer attachment is necessary.

By making the appropriate selection in the gear ratio, the transmission ratios can be adjusted in such a way that with a seven-speed dual clutch transmission the direct gear is either the fifth G5 or the seventh gear G7. With reference to the eight-speed dual clutch transmission, the fifth gear G5 is preferred. Within this design, it is possible with regard to geometry, manufacturing process and the function of, for the most part, a same set of gear components to create different dual clutch transmissions which, in terms of a direct gear, are a different overall gear ratio and gear jumps by way of varying the tooth numbers of few gears, and these can be used in a very advantageous manner for different vehicles and/or different vehicle motorizations.

Thus, within the meaning of an exemplary embodiment of the invention, FIG. 1 shows a dual clutch transmission 11, its dual clutch 1 encompassing two successively arranged axial clutch means K1 and K2. The input side of the dual clutch 1 stays, in this case, in a mechanical drive connection with a motor shaft 2 of a motor vehicle, for example. The output side of the first clutch means K1 is coupled with a hollow input shaft 4 at the end of which, away from the clutch, there is a fixed gear 6 attached. The output side of the second clutch means K2, on the other hand, is embodied by way of a centric drive shaft 3 which is arranged inside the hollow drive shaft 4 and which has a fixed gear 5 and a shaft bearing 16 inserted at its free end in which is a transmission output shaft 17.

Moreover, the dual clutch transmission 11 has two countershafts 7 and 8 with countershaft 8 being embodied as a hollow shaft into which, coaxially, the other countershaft 7 is rotationally mounted, completely penetrating the hollow shaft.

The dual clutch transmission 11 has a number of gear levels 01 to 08 in which gears are arranged that mesh with each other. The first gear level 01 is embodied by the fixed gear 6 arranged on the hollow input shaft 4 and a fixed gear 9, whereby the latter is affixed on the coaxially arranged countershaft 7. On the second gear level 02, the fixed gear 5, affixed on the coaxial input shaft 3, meshes with a fixed gear 10 which sits non-rotationally on the hollow countershaft 8. Both gear level 01 and 02 embody the so-called drive constants of the dual clutch transmission 11.

As is further shown in FIG. 1, the hollow countershaft 8 carries an idler gear 13 at its clutch-remote end which meshes with a fixed gear 15 on the transmission output shaft 17. In addition, between the first fixed gear 10 and the idler gear 13, an additional fixed gear 12 is fastened on gear level 03 to the hollow countershaft 8, and this gear meshes with an idler gear 14 on the drive shaft 17 and that is allocated to the third transmission gear G3, given all usable gear variations in this case. The idler gear 14 has, as do all other idler gears of the transmission, a coupling gearing 27 for a coupling element of the coupling device (here A-B).

In this exemplary embodiment, the coaxially arranged countershaft 7 carries only fixed gears 9, 18, 19, 20 and 21 which are allocated to different transmission gears, in part also serving a dual use purpose. These fixed gears 9, 18, 19, 20 and 21 are, as far as they are used as gear wheels, in tooth contact with related idler gears 22, 23, 24 and 25 on the transmission output shaft 17. The idler gears 13, 14, 22, 23, 24, 25 of the transmission are by way of the coupling devices A-B, C-D, E-F, H-G rotationally connectable with that specific transmission shaft to which they are rotationally mounted.

Before providing more detailed explanations on the operational mode of the dual clutch transmission 11, it should be pointed out that the coaxial countershaft 7 has a coupling gear 26 through which the countershaft 7 with the aid of coupling device C-D is non-rotationally connectable with the hollow shaft 8. For this purpose, a coupling element (for example, a sliding sleeve) of the coupling device is moved into direction D. The coupling device C-D (shift direction C) by the way is also intended to function as a technical drive connection for the idler gear 13 on the hollow countershaft 8, and by said means to actuate the fifth gear G5 or seventh gear G7 in gear level 04, provided they are not embodied as direct gears.

Besides, the additional coupling device A-B is arranged between the gear levels 02 and 03 which, in case of an axial deflection into direction A (thus in the direction of the dual clutch 1), aids in directly connecting the coaxially arranged input shaft 3 via a coupling gear 28 with the transmission output shaft 17. When actuating the coupling device in direction B, on the other hand, the idler gear 14 for the realization of the third gear G3 is rotationally connected with the transmission output shaft 17.

Furthermore, the dual clutch transmission has a coupling device E-F between the two gear levels 05 and 06 for the purpose of shifting the sixth gear G6 or the fourth gear G4 and a coupling device H-G between gear levels 08 and 07.

By axially displacing the coupling elements of the coupling device H-G into direction H, the idler gear 24 is connected with the transmission shaft 17 and thus the first or second reverse gear R1 or R2 is engaged in dependence of the currently actuated clutch K1 or K2.

A displacement of the coupling element of the coupling device H-G into direction G leads to a rotational connection of the idler gear 25 with the transmission output shaft 17, so that in dependence of the present clutch actuation layout the shift into first gear G1 or second gear G2 can take place.

As in FIG. 1, the listed gear positions G1, G2, G3, G4, G5, G6, G7, G8, RG1 and RG2 clearly clarify above the numbers for the different gear levels, the gear pairings of the transmission can be used for different speeds. It can thus be clearly recognized that also independently of the direct gear selection (fifth gear G5 or seventh gear G7) the gears of gear level 02 can be used for an eight-speed dual clutch transmission for the eighth gear G8 and the fifth gear G5, and also for a seven-speed dual clutch transmission for the fifth gear G5 or seventh gear G7.

Moreover, the gear level 04 in the the seven-speed dual clutch transmission is usable for the fifth gear G5 or the seventh gear G7. Additionally, gears 21, 25 of gear level 07, as previously mentioned, are used for the realization of the first gear G1 or the second gear G2, while gears 20, 24 of gear level 08 are alternatively available for the two reverse gears RG1 and RG2.

The mode of operation of the two only minutely different seven-speed dual clutch transmissions and an eight-speed dual clutch transmission can best be clarified by way of a combined look at the gear structure in accordance with FIG. 1, and the actuating tables in accordance with FIGS. 2 and 4. The actuating tables show which one of the two clutches K1 and/or K2 of the dual clutch transmission 1, together with the coupling devices with regard to their actuating positions A to H, are to be actuated in order to be able to shift one of the possible transmission gears G1 to G7 (FIG. 2 and FIG. 3) and/or G1 to G8 (FIG. 4). Moreover, these tables show the corresponding gear ratio "i" for each gear and, on the top right respectively, the overall gear ratio of the transmission "phi" and below that the respective gear jumps.

In accordance with FIG. 2, marked by a black dot, in a seven-speed dual clutch transmission with the fifth gear G5 as direct gear for the purpose of engaging into first gear, the coupling element of the coupling device C-D is moved into direction D so that the centric countershaft 7, via its coupling gear 26, is rotationally fixed with the hollow countershaft 8. Also, the coupling element of the coupling device H-G is shifted into direction G, so that the idler gear 25 is rotationally fixed with the transmission output shaft 17. Subsequently, the clutch K2 is closed, so that now the input torque of the motor shaft 2 is transferred onto the transmission output shaft 17, via the transmission input shaft 3, the fixed gears 5 and 10, the hollow countershaft 8, the coupling gear 26, the centric countershaft 7, the fixed gear 21 and the idler gear 25.

In the seven-speed dual clutch transmission layout in accordance with FIG. 1 and FIG. 2, for example, adjusts to a gear ratio of i=4.8 for the first gear G1, which is also used advantageously for the other dual clutch transmissions of these transmission modules (see FIG. 3 and FIG. 4).

For the purpose of shifting into second gear G2, the coupling device C-D in accordance with FIG. 1 and FIG. 2 is held in its position D without the same having any consequences for the gear ratio of the second gear G2. Moreover, the coupling device A-B is brought into shift position B for the purpose of engaging the third transmission gear G3, which is marked by the white dots on the second line of the table. In this way, the rotationally fixed connection between the fixed gear 21 on the centric countershaft 7 and the idler gear 25 on the transmission output shaft 17 (actuation position G) is also maintained.

By opening clutch K2 and closing clutch K1, the input torque of drive shaft 2, via the hollow drive shaft 4 and the fixed gears 6 and 9, is directed onto the coaxial countershaft 7, from which it is transferred, via the fixed gear 21 and the still rotationally fixed idler gear 25, onto the transmission output shaft 17. Although for the second gear G2, gears 21, 25 of the same gear level 07 are being used as for the first gear G1, an adjustment to the new gear ratio i=2.7 does take place by including fixed gears 6 and 9 in place of the fixed gears 5 and 10.

The fifth gear G5 in this seven-speed dual clutch transmission 11 is embodied as direct gear, which among other things can be recognized by its gear ratio with the value of i=1. In order to shift this fifth gear G5, the coupling element of the coupling device A-B is merely being moved into direction A and clutch K2 is closed. In this way, the torque of the motor shaft 2, via clutch K2, is directed onto the coaxially arranged input shaft 3 and its coupling gear 28 and from there, via the coupling device A-B, passed on to the transmission input shaft 17. As the white dots in FIG. 2 indicate, the coupling device E-F in this gear situation is in actuating position E or F, so that the shift activity from fifth gear G5 into the sixth gear G6 or from fifth gear G5 into fourth gear G4 by way of opening clutch K2 and closing clutch K1 can be carried out without torque discontinuity at the transmission output shaft 17.

The other gears of the dual clutch transmission 11 with seven forward and two reverse gears are actuated analogously by following the actuating instructions in accordance with FIG. 2.

For the purpose of now obtaining a seven-speed dual clutch transmission with a lower overall gear ratio, based on the just described seven-speed dual clutch transmission and maintenance of all other gear components, it is merely necessary to adjust the gears of gear levels 01 and 03 to 06 with their tooth number in such a way that, on the one hand, the direct gear no longer is the fifth gear G5, but is the seventh gear G7 and that sensible gear jumps are put into practice. Thus, the gears of gear levels 02, 07 and 08 can be advantageously maintained, along with the gear level positions in the transmission, as well as the coupling device and transmission shafts. Moreover, the first gear G1 and the two reverse gears R1 and/or R2 in a second seven-speed transmission can be realized with the same gears and accordingly with the same gear ratios.

As FIG. 1 above the numbers for gear levels 02 and 04 shows, the fifth gear G5 or seventh gear G7 in both of the seven-speed dual clutch transmissions are realized as direct connection between the central drive shaft 3 and the coaxial drive shaft 4 or via gear level 04. A comparison of the actuating tables in accordance with FIG. 2 and FIG. 3, moreover, shows that the two transmissions differ for the most part in that either the fifth gear G5 or the seventh gear G7 are embodied as direct gear and that the gear ratios (except for gears G1, R1, R2) are different.

By said means with reference to its overall gear ratio and its ratio steps, another seven-speed dual clutch transmission is envisioned, which shows to a great extent the same kind of parts as are shown by the aforementioned seven-speed transmission which, in turn, has a favorable cost-savings effect. As a comparison of the actuating table of FIG. 2 and FIG. 3 shows, the starting gear ratio with both transmissions, due to the unchanged use of the gear wheels, for the first gear is a constant i=4.8. The ratio gradation, however, has changed between the individual gears as well as the overall gear ratio, which reduced from phi=6.8 to phi=4.8.

Furthermore, in accordance with FIG. 2, the transmission shows two overdrive-gears G6 and G7 with which a vehicle can be operated in a particular fuel-saving manner. In contrast here, in accordance with FIG. 3, the transmission does not show an overdrive gear.

All in all, as a result of their shift mechanisms, as well as the resulting operating behavior of a motor vehicle, these two seven-speed dual clutch transmissions are in this way very different so that the transmission, in accordance with FIG. 2, for example, can be used for a heavily motorized motor vehicle with a diesel-internal combustion engine and the transmission, in accordance with FIG. 3, more likely for a sports car with a 4-stroke-engine.

Finally, FIG. 4 clearly shows that the dual clutch transmission, in accordance with FIG. 1, can also be used as eight-speed transmission with an overall gear ratio of phi=8.6. For this purpose, the fifth gear G5 is embodied as a direct gear so that, in the end in accordance with FIG. 2 and FIG. 4, the actuating tables are not very different from one another. For this purpose, the eighth gear G8 is engaged by actuating the coupling device A-B in the direction A and the coupling device C-D into direction D and by closing the clutch K1.

As FIG. 4, in connection with FIG. 1, shows that the engine torque provided by the motor shaft 2, via the hollow input shaft 4, and the fixed gears 6 and 9 is then transferred onto the coaxially arranged countershaft 7. From there it reaches the hollow countershaft 8 and its fixed gear 10, via the coupling gear 26, which meshes with the fixed gear 5 on the centric input shaft 3. In this way, the torque is directed toward the coupling gear 28 and from there it is directed onto the transmission output shaft 17 via the displaced coupling device A-B to A.

By way of this arrangement, one can attain a very compact eight-speed dual clutch transmission with two reverse gears producible in a manufacturing plant, combined with the two seven-speed dual clutch transmissions, which has a total of three available overdrive gears G6, G7 and G8.

| Reference numerals | |
|---|---|
| 1 | dual clutch |
| 2 | motor shaft |
| 3 | coaxial input shaft |
| 4 | hollow drive shaft |
| 5 | fixed gear on input shaft 3 |
| 6 | fixed gear on input shaft 4 |
| 7 | coaxial countershaft |
| 8 | hollow countershaft (hollow shaft) |
| 9 | fixed gear on countershaft 7 |
| 10 | fixed gear on countershaft 8 |
| 11 | dual clutch transmission |
| 12 | fixed gear |
| 13 | idler gear on hollow countershaft |
| 14 | idler gear |
| 15 | fixed gear |
| 16 | shaft bearing for transmission output shaft on input shaft 3 |
| 17 | transmission output shaft |
| 18 | fixed gear |
| 19 | fixed gear |
| 20 | fixed gear |
| 21 | fixed gear |
| 22 | idler gear |
| 23 | idler gear |
| 24 | idler gear |
| 25 | idler gear |
| 26 | coupling gear |
| 27 | coupling gear |
| 28 | coupling gear |
| i | gear ratio |
| phi | overall gear ratio: gear ratio jump |
| K1 | first clutch |
| K2 | second clutch |
| A-B | coupling device |
| C-D | coupling device |
| E-F | coupling device |
| H-G | coupling device |
| 01 | gear level |
| 02 | gear level |
| 03 | gear level |
| 04 | gear level |
| 05 | gear level |
| 06 | gear level |
| 07 | gear level |
| 08 | gear level |
| G1 | first gear |
| G2 | second gear |
| G3 | third gear |
| G4 | fourth gear |
| G5 | fifth gear |
| G6 | sixth gear |
| G7 | seventh gear |
| G8 | eighth gear |
| R1 | reverse gear |
| R2 | reverse gear |
| RG1 | reverse gear |
| RG2 | reverse gear |

The invention claimed is:

1. A dual clutch transmission (11) with a dual clutch (1) in which an output side of a first clutch (K1) is connected with a hollow first drive shaft (4) and an output side of a second clutch (K2) is connected with a second drive shaft (3) coaxial arranged in the hollow first drive shaft (4), each of the first and second drive shafts (3, 4) has a fixed gear (5, 6), the transmission (11) has two countershafts (7, 8) and a first of the two countershafts (8) is a hollow shaft within which a coaxial countershaft (7) is rotationally mounted, each of the two countershafts (7,8) has a fixed gear (9, 10), and the fixed gear (6) of the hollow first drive shaft (4) meshes with the fixed gear (9) of the coaxial countershaft (7) and the fixed gear (5) of the coaxial second drive shaft (3) meshes with the fixed gear (10) of the hollow countershaft (8);

wherein transmission output shaft (17) is coaxially aligned with the first and the second drive shafts (3, 4), the two countershafts (7, 8) each have one or more of idler and/or fixed gears which mesh with one of an idler or a fixed gear of the transmission output shaft (17), and each of the idler gears of the transmission (11) are rotationally fixed with at least one of the transmission output shaft (17) and the two countershafts (7,8) by one of a plurality of coupling devices (A-B; C-D; E-F; G-H), the two countershafts (7,8) are rotationally connectable with one another by a first coupling device (C-D), and an idler gear (13), of the hollow countershaft (8), meshes with a fixed gear (15) of the transmission output shaft (17).

2. The dual clutch transmission according to claim 1, wherein by axially displacing the first coupling device (C-D) into a first direction (D), the two countershafts (7,8) are connectable, and by displacement into the opposite direction (C), the idler gear (13) on the hollow countershaft is rotationally fixable with the fixed gear (15) on the transmission output shaft (17).

3. The dual clutch transmission according to claim 1, wherein the idler gear (13) on the hollow countershaft is arranged on the axial end of the hollow countershaft (8).

4. The dual clutch transmission according to claim 1, wherein the coaxial countershaft (7) exclusively carries the fixed gears (9, 18, 19, 20, 21).

5. The dual clutch transmission according to claim 3, wherein the hollow countershaft (8) carries two fixed gears (10, 12) as well as the idler gear (13).

6. The dual clutch transmission according to claim 1, wherein said transmission can be realized for seven or eight forward gears (G1 to G8) and two reverse gears (R1, R2).

7. The dual clutch transmission according to claim 1, wherein the transmission is a even-speed transmission, the fifth gear (G5) or the seventh gear (G7) is a direct gear with a gear ratio of i=1.

8. The dual clutch transmission according to claim 1, wherein the transmission is a seven-speed transmission with the fifth gear (G5) as direct gear, the gears for the sixth gear (G6) and the seventh gear (G7) attain a gear ratio of i<1.

9. The dual clutch transmission according to claim 1, wherein the transmission is a seven-speed transmission with the seventh gear (G7) as direct gear, the gears for the seventh gear (G7) attain a gear ratio of i=1, and there is no transmission gear with a gear ratio range of i<1 available.

10. The dual clutch transmission according to claim 1, wherein the transmission is an eight-speed transmission with the fifth gear (G5) as direct gear, the gears for the sixth gear (G6), the seventh gear (G7) and the eighth gear (G) attain a gear ratio of i<1.

11. The dual clutch transmission according to claim 1, wherein a seven-speed transmission with the fifth gear (G5) as direct gear, and the transmission with a seventh gear (G7) as direct gear or as eight-speed transmission is embodied in such a way, that they show equal starting gear ratios.

12. The dual clutch transmission according to claim 1, wherein for the realization of a seven-speed transmission with the fifth gear (G5) as direct gear, and two overdrive gears (i<1), or of a seven-speed transmission with the seventh gear (G7) as direct gear, the gears of gear level 02 and gear level 04 with reference to their gear ratios are switched, and the gears of gear level 01 with reference to their tooth number are changed in such a way, that the gear ratio (i) of gear level 02 to gear level 01 are almost equal to both transmission variants.

13. The dual clutch transmission according to claim 1, wherein for the realization of a seven-speed transmission with the fifth gear (G5) as direct gear, and two overdrive gears (i<1), or of a seven-speed transmission with the seventh gear (G7) as direct gear, the gears of gear levels 01 and 03 through 06 are changed in such a way, that two transmissions with different overall gear ratios relative to each other can be assembled.

14. The dual clutch transmission according to claim 1, wherein for realization of an eight-speed transmission with the fifth gear (G5) as direct gear, and three overdrive gears (i<1), the gears of the gear levels are changed in such a way, that a transmission is assembled, which in comparison to a seven-speed transmission with the fifth gear (G5) as direct gear and two overdrive gears (i<1) or to the seven-speed transmission with the seventh gear (G7) as direct gear, show the same starting gear ratios (i=const.) and a higher overall gear ratio.

15. The dual clutch transmission according to claim 1, wherein an eighth gear (G8) is not embodied free of interruption of tractive force during a shift.

16. The dual clutch transmission according to claim 1, wherein a gear ratio of gear level 01 is smaller than a gear ratio of gear level 02 and gear level 04.

17. The dual clutch transmission according to claim 1, wherein for the transmission with a fifth gear (G5) as direct gear, a gear ratio of gear level 02 is smaller than the gear ratio of gear level 04.

18. The dual clutch transmission according to claim 1, wherein for the transmission with a seventh gear (G7) as direct gear, a gear ratio of gear level 02 is larger than a gear ratio at gear level 04.

* * * * *